RINGING CIRCUIT

Filed Dec. 5, 1952

INVENTOR
R. J. KIRCHER
BY J. W. Schmied
ATTORNEY 2,759,179

RINGING CIRCUIT

Reymond J. Kircher, Summit, N. J., assignor to Bell Telephone Laboratories, Incorporated, New York, N. Y., a corporation of New York Application December 5, 1952, Serial No. 324,178

7 Claims. (Cl. 340—401)

This invention relates to station signaling circuits and more particularly to improved means for telephone station signaling.

One of the objects of the invention is to provide an improved telephone station signaling circuit employing new circuit elements of compact size, economical construction, and low current consumption with very long life of service.

Another object of the invention is to provide a suitable calling signal at a telephone subscriber's station without the use of a bell or gas discharge activated gong-type ringer.

Still another object of the invention is to provide means for producing an audible signal comprising tones in the audio frequency range, in particular from 400 to 600 cycles per second, at an acoustic level of approximately 25 microwatts, by means which are energized solely by low frequency signaling current such as the conventional 20-cycle telephone ringing supply or even, if desired, by the direct-current battery supply.

Still another object of the invention is to provide a novel signaling system which supplies a continuous audible tone over both halves of the ringing current signal.

Still another object of the present invention is the provision of a novel signaling circuit that provides a continuous insistent ringing signal composed of a different tone for each half of the ringing current signal.

Still another object of the present invention is the provision of a novel ringing circuit that is highly efficient in the conversion of electrical to sound energy.

The invention resides in novel circuit combinations by which three electrode semiconductor devices, now known generally as transistors, are employed in telephone subscribers' station circuits, in combination with an electroacoustical transducer as means for producing a suitable audible signal by which the subscriber's attention is attracted when his station is called. The circuit may be then broadly designated as a transducer circuit as well as a ringing or signaling circuit. In the specific embodiments exemplary of the present invention disclosed herein, the signaling circuit at the subscriber's station has two transistors which alternately function to produce a dual tone. Each transistor is part of a transistor ringing oscillator which utilizes the same acoustic horn. The use of the acoustic horn, together with the use of both halves of the ringing current, provide an efficient conversion of the electrical energy to sound energy. The operation of the transistor ringing oscillators is controlled by diodes incorporated therein.

Further objects and advantages will become apparent to those skilled in the art upon consideration of the description taken in conjunction with the drawings wherein.

Figure 1:
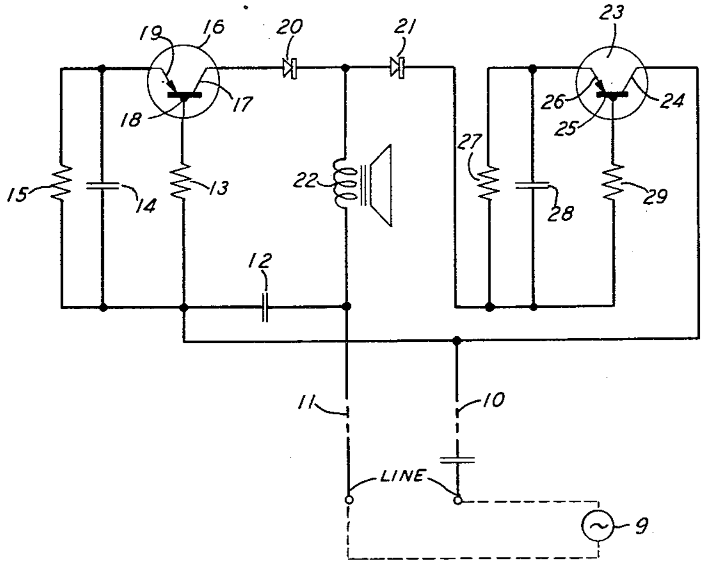
Fig. 1 is one embodiment of the signaling circuit of the present invention.

To simplify the disclosure of the invention the talking portions of the telephone stations illustrated in the drawings have been omitted and only the signaling portions of the circuit at the station are disclosed. Although the invention is not limited to telephone use, but may be employed simply for remote station signaling, it will be obvious to those familiar with the telephone art that speech transmitting and receiving apparatus may be added to the station circuit illustrated in the drawings, in a manner which is well known in the art, and that any one of many well-known types of telephone station sets may be employed. A preferred telephone talking circuit which may be employed with the station signaling circuits of the invention is disclosed by the Patent 2,629,783, which issued to H. F. Hopkins on February 24, 1953. A preferred form of telephone station set for use with the invention is disclosed by the Patent 2,578,367 to E. E. Mott, which issued December 11, 1951.

Referring to Fig. 1 the station ringing or transducer circuit comprises two three-electrode semiconductor devices 16 and 23 which, in the preferred embodiment, are type A transistors. The base electrode 18 of transistor 16 is connected to one side 10 of the line through a resistor 13, the emitter electrode 19 of transistor 16 is connected through a parallel network comprising the resistor 15 and the capacitor 14 to the same side 10 of the line, and the collector electrode 17 of transistor 16 is connected through the diode 20 and the driving coil 22 of an electromagnetic transducer to the opposite side 11 of the line. Typical values for these components are a resistance of from 500 to 1500 ohms for resistor 15, a capacitance of .25 to .50 microfarad for capacitor 14, and a resistance of approximately 1000 ohms for resistor 13. The two sides 10 and 11 of the line are bridged by the shunting capacitor 12 which is thus also connected to resistor 15, capacitor 14, resistor 13 on one side and coil 22 on the other. In the preferred embodiment of the present invention the capacitance of capacitor 12 is approximately .5 microfarad.

Energization of the subscriber's station circuit is accomplished by 20-cycle ringing current from source 9 in the central office, not shown. The ringing current causes the circuit associated with transistor 16, as described above, to oscillate at a frequency which is determined by the constants of the various components. With the typical values disclosed herein, and hereinafter tabulated, the circuit oscillates at a frequency of approximately 500 cycles per second. Through the action of the transistor 16, which serves as an ocillator providing self-rectification for self-biasing, oscillations of large amplitude drive the acoustical horn 22 which may be formed from a ring armature type telephone receiver in the manner disclosed in the above-mentioned patent to E. E. Mott.

Figure 2:
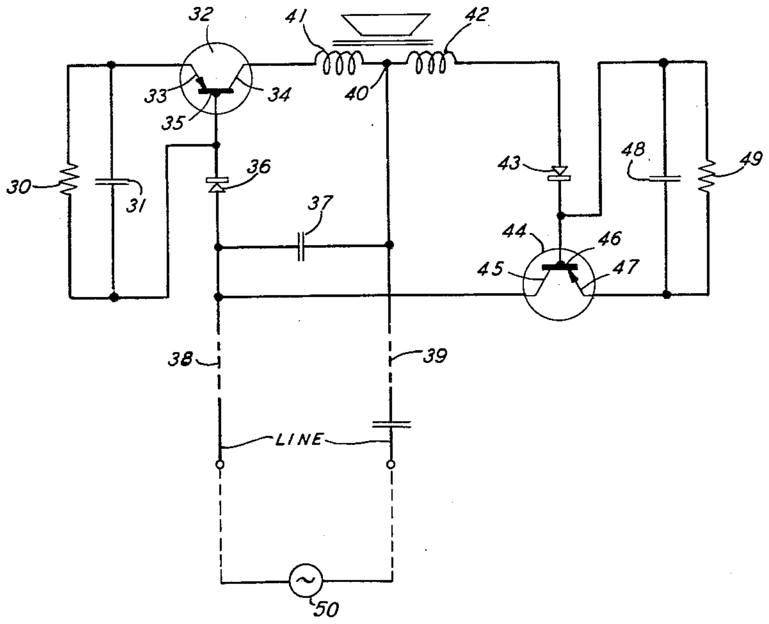
Fig. 2 is a second embodiment of the signaling circuit of the present invention.

For a more detailed description of the manner in which a transistor generally functions as an oscillator when connected in circuits similar to those shown in Figs. 1 and 2, reference may be had to the teaching of L. A. Meacham in Patent 2,556,286 which issued June 12, 1951. One of the features of the present oscillator circuit which distinguishes it from the multivibrator transistor oscillators of the Meacham patent is the used of the inductance of an armature coil in the collector circuit instead of employing a resistive element. The use of inductive reactance in this portion of the circuit has been found on both an experimental and theoretical basis to contribute the property of very markedly lowering the frequency of multivibrator oscillation as compared to the frequency resulting from the use of a resistance at this point of the circuit, as taught by Meacham. As stated above, the particular inductive reactance used in the preferred embodiment of the invention is a standard telephone headset armature coil which, in conjunction with the condenser and resistance network of the emitter circuit, establishes in a non-critical manner the frequency of oscillation for the ringing oscillator circuit. The coil 22 of this horn radiator has a direct-current resistance of only 1000 ohms or less, whereas the transistor multivibrator circuits heretofore disclosed have generally required a collector load resistance of 5000 ohms or more. The use of this low resistance horn coil produces a load of sufficiently high impedance to enable the transistor 16 to operate efficiently while at the same time affording means for effectively coupling the output of the transistor 16 to the relatively low impedance magnetic horn 22. The resulting audible frequency which is emanated by the horn has a fundamental frequency of approximately 500 cycles per second, enriched by many overtones which give the signals an insistent quality. This sound carries greater distances and may be heard by more persons than is the case with the present gong type bell ringers which produce a higher pitched sound.

The transistor 16 and its associated circuitry oscillate only upon one-half of the 20-cycle signal from source 9 through the sides or leads 10 and 11 of the line. When the side 11 is positive and the side 10 is negative the diode 20 essentially blocks any current to the collector 17 of transistor 16. Ringing current from the side 11 during its positive cycle however, passes through the coil 22 and the diode 21 which is poled towards the base 25 of the transistor 23 through the resistor 29, described above. The emitter 26 is connected through the parallel combination of resistor 27 and capacitor 28 to diode 21 and the collector 24 is connected to the lead 10 of the line. The transistor 23 functions in conjunction with its surrounding circuitry and coil 22, to oscillate and provide a tone through the acoustic horn associated with coil 22. On the other half of the ringing cycle when lead 11 is negative and lead 10 is positive, the diode 21 prevents the transistor 23 from functioning and the diode 20 allows the transistor 16 to function. One of the transistor oscillator circuits operates in this manner at any given time. The circuit parameters of the components associated with the transistor 23 may have the same values as those associated with the transistor 16 or they may be of different value. If the values are the same the acoustic horn 22 will emit a continuous, constant pitch, tone over the complete cycle of the ringing current, and if the values are different it will emit a different tone over each half. The two different tones can be so chosen by selecting the circuit parameters as to provide a pleasant combination tone for the subscriber's ear. The entire cycle of the ringing current is efficiently utilized in this manner to provide the compound audio tone. If one of the transistors 16 or 23 ceases to operate or function, a signal over one-half cycle will still be provided by the other transistor.

A suitable set of values for the circuit parameters of Fig. 1 to provide a pleasing tone is as follows:

| | | |
|---|---|---|
| Capacitor 12 | mf | 0.50 |
| Resistor 13 | ohms | 900 |
| Capacitor 14 | mf | 0.50 |
| Resistor 15 | ohms | 1000 |
| Resistor 27 | do | 500 |
| Capacitor 28 | mf | 0.50 |
| Resistor 29 | ohms | 500 |

Referring now to Fig. 2 which shows a second embodiment of the present invention for providing a highly efficient conversion of electrical energy to audio energy, the two transistors 32 and 44 are inverted with respect to one another and connected to opposite ends of the inductive element or coils 41 and 42. The coils 41 and 42 are part of an acoustic horn and are connected through their junction point or center tap 40 to the lead 39 of the line. The lead 39 and the lead 38 are connected to the source 50. The lead or side 38 of the line is connected to the collector 45 of transistor 44, to the base 35 of transistor 32 through the diode 36 and to the emitter 33 of transistor 32 through the parallel branch consisting of capacitor 31 and resistor 30 and the serially connected diode 36. The two leads 38 and 39 are shunted by the capacitor 37, and the coil 42 is connected to the base 46 of transistor 44 through the diode 43. The base 46 is connected to the emitter 47 of transistor 44 through the parallel circuit of resistor 49 and capacitor 48. The diodes 36 and 43 are poled to be in an easy flow condition when the respective transistor collector to base potential is negative. When the lead 38 is positive upon the application of the signaling current thereto, transistor 32 in conjunction with coil 41 oscillates providing a tone of one pitch and when the lead 38 is negative the transistor 44 in conjunction with coil 42 oscillates to provide a tone of a different pitch. A continuous sequence of the same or different pitched tones is thus provided depending upon the values of the various circuit parameters. If the values of the circuit parameters associated with the transistors 32 and 44 are equal, and if the two transistors themselves are equivalent, the same tone is provided over both halves of the ringing cycle. The transistors 32 and 44 are inverted with respect to one another to provide for the continuous utilization of the ringing current. If the transistor 44 and its associated circuit were not inverted but simply a mirror image of the transistor 32 and its associated circuit so that, for example, both collectors were connected to the coils 41 and 42, then the two transistors 32 and 44 would oscillate over the positive cycles of lead 38 and neither would oscillate over its negative cycles.

A suitable set of values for the circuit parameters of Fig. 2 to provide a pleasing tone is as follows:

| | | |
|---|---|---|
| Resistor 30 | ohms | 1000 |
| Capacitor 31 | mf | .50 |
| Capacitor 37 | mf | .50 |
| Capacitor 48 | mf | .50 |
| Resistor 49 | ohms | 1000 |

It is to be understood that the above-described arrangements are illustrative of the application of the principles of this invention. Numerous other arrangements may be devised by those skilled in the art without departing from the spirit and scope of the invention as, for example, the circuit elements 14 and 15 in Fig. 1 may be connected directly to the base of the transistor 16 or the circuit elements 30 and 31 in Fig. 2 may be connected directly to the conductor 38 of the line.

What is claimed is:

1. A signaling circuit having a first and second transistor oscillator circuit with each comprising, as an inductive element, the coil of the same electroacoustical transducer; and means for alternatively operating said first and second oscillator circuits to provide an uninterrupted dual tone.

2. A ringing circuit comprising a source of alternating current; a first and second transistor connected to said source; an inductive ringing element; and a first and second diode connecting respectively said first transistor to one side of said ringing element and said second transistor to the other side of said ringing element whereby said first transistor and said ringing element oscillate upon one-half cycle of current from said source and said second transistor and said ringing element oscillate upon the other half cycle.

3. A transducer circuit comprising an electro-acoustical transducer having an armature coil; a first and second transistor with each having a base, emitter and collector electrode; a first and a second diode, said first diode connecting said collector of said first transistor with said transducer; a first and second base resistor respectively for said first and second transistors, said second diode connecting said second base resistor with said coil; a first and second emitter circuit respectively for said first and second transistors; an alternating-current signal voltage source having one lead connected to said coil and a second lead connected to said first base resistor and to said collector of said second transistor, thereby to cause the alternate energization of said transistors and the continuous energization of said transducer.

4. A signaling circuit comprising a source of alternating potential; a center tapped transducer having its center tap connected to said source; a first and second transistor inverted with respect to each other and connected to said transducer; and means for alternatively oscillating said first and second transistors over the half cycles of said source of alternating potential.

5. In a signaling circuit, a source of alternating signal voltage, a first and second transistor connected to said source, an electro-acoustical transducer having a coil connected to said first and second transistor, means connected to said first transistor effective on half cycles of one polarity of said alternating signal voltage for producing a circuit of maximum current flow through said first transistor and said coil, and means connected to said second transistor effective on half cycles of said other polarity of said alternating signal voltage for producing a circuit of maximum current flow through said second transistor and said coil, said transducer operating on the maximum current flowing alternately through each of said circuits.

6. In a signaling circuit; a source of alternating signal voltage; a first and second transistor connected to said source; an electro-acoustical transducer connected to said first and second transistor having an armature coil; rectifier means connected to said first transistor for preventing said first transistor and said coil from oscillating over the positive half cycles of said signal voltage from said source; and rectifier means connected to said second transistor for preventing said second transistor and said coil from oscillating over the negative half cycles of said signal voltage from said source.

7. In a signaling system in combination, line terminals connectable to a signaling line for receiving low frequency signaling current, a first oscillator circuit including a first transistor, a second oscillator circuit including a second transistor, an electro-acoustical transducer connected to said first and second transistors, a first rectifier means connecting said first oscillator circuit to said signaling line terminals for energizing said oscillator circuit in response to half cycles of a predetermined polarity of the low frequency alternating current received at said terminals, and a second rectifier means connecting said second oscillator circuit to said line terminals for energizing said second oscillator circuit in response to half cycles of the opposite polarity of the low frequency signaling current received by said terminals.

References Cited in the file of this patent

UNITED STATES PATENTS 1,743,711 Field ------------------ Jan. 14, 1930